(12) United States Patent
Teragawa

(10) Patent No.: US 9,632,228 B2
(45) Date of Patent: Apr. 25, 2017

(54) LIGHT SOURCE DEVICE AND DISPLAY APPARATUS

(71) Applicant: Sakai Display Products Corporation, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/431,539

(22) PCT Filed: Mar. 31, 2014

(86) PCT No.: PCT/JP2014/059391
§ 371 (c)(1),
(2) Date: Mar. 26, 2015

(87) PCT Pub. No.: WO2015/151142
PCT Pub. Date: Oct. 8, 2015

(65) Prior Publication Data
US 2016/0109637 A1    Apr. 21, 2016

(51) Int. Cl.
*G02F 1/1335* (2006.01)
*F21V 8/00* (2006.01)

(52) U.S. Cl.
CPC ......... *G02B 6/0033* (2013.01); *G02B 6/0055* (2013.01); *G02B 6/0043* (2013.01); *G02B 6/0061* (2013.01); *G02B 6/0065* (2013.01)

(58) Field of Classification Search
CPC .. G02B 6/0033; G02B 6/0043; G02B 6/0055; G02B 6/0061; G02B 6/0065; F21S 2/00; F21V 17/00; G02F 1/133605

USPC ........................................................... 349/65
See application file for complete search history.

(56) References Cited

U.S. PATENT DOCUMENTS

| | | | |
|---|---|---|---|
| 2010/0061087 A1* | 3/2010 | Stevens | G02F 1/133605 362/97.3 |
| 2012/0147627 A1* | 6/2012 | Pan | G02B 6/0051 362/624 |
| 2013/0002979 A1* | 1/2013 | Nakamura | G02B 6/0055 349/58 |

FOREIGN PATENT DOCUMENTS

| | | |
|---|---|---|
| JP | 10-021720 | 1/1998 |
| JP | 2007-225686 A | 9/2007 |
| JP | 2012-124162 A | 6/2012 |
| JP | 2013-093195 A | 5/2013 |

(Continued)

*Primary Examiner* — Nathanael R Briggs
(74) *Attorney, Agent, or Firm* — Rudy J. Ng; Bret E. Field; Bozicevic, Field & Francis LLP

(57) ABSTRACT

Provided are a light source device which may disperse a force shifted in a plane direction due to a difference in thermal expansion by a reflection sheet so as to maintain good display quality, and a display apparatus using the light source device. The light source device includes a transparent plate used as a light guide plate, a light source disposed to face a part of a peripheral surface of the transparent plate along the part thereof, and a reflection sheet attached to one wide surface of the transparent plate, and the reflection sheet is provided with a plurality of cut lines formed in a prescribed range including a center thereof at a prescribed interval. Thereby, even if the transparent plate and the reflection sheet are thermally expanded in relation to the different expansion coefficients from each other, it is possible to prevent the reflection sheet from being peeled off from the transparent plate.

14 Claims, 8 Drawing Sheets

(56) References Cited

FOREIGN PATENT DOCUMENTS

WO     WO2011092902 A1     8/2011

\* cited by examiner

F I G. 7
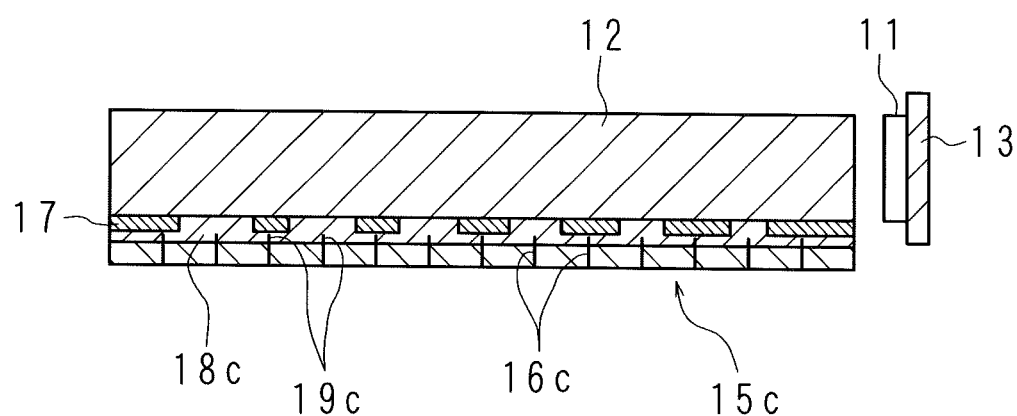

LIGHT SOURCE DEVICE AND DISPLAY APPARATUS

This application is the national phase under 35 U.S.C. §371 of PCT International Application No. PCT/JP2014/059391 which has an International filing date of Mar. 31, 2014 and designated the United States of America.

BACKGROUND OF THE INVENTION

1. Field of the Invention

The present invention relates to a light source device capable of maintaining good display quality in a display apparatus using a liquid crystal panel, and a display apparatus including the light source device.

2. Description of Related Art

In recent display apparatuses using a liquid crystal panel, in order to thin the display apparatus and suppress luminance unevenness in a screen, edge light type light source devices are frequently used. The edge light type light source device is configured in such a manner that a plurality of light emitting diodes are disposed to face an end face of a transparent plate referred to as a light guide plate, and uniformly emits light incident on the end face from one wide surface. Such a light source device further has scattering dots provided on the other wide surface of the light guide plate to increase uniformity of the emitted light by scattering the light reaching the other wide surface, and a reflection sheet provided to totally reflect the light reaching the other wide surface.

The reflection sheet is often attached to the other wide surface of the light guide plate. For example, there is an example of a light source device in which the reflection sheet is attached to the light guide plate by scattering adhesive dots which satisfy both of a role of the scattering dot and a role of an adhesive for attaching the reflection sheet. In addition thereto, as an example of attaching a sheet to the light guide plate, there is another example of a light source device in which an optical sheet is provided with a dot-to-dot part on the peripheral edge part thereof, and the optical sheet is dot-to-dot adhered to the light guide plate.

SUMMARY OF THE INVENTION

The reflection sheet and the light guide plate in the display apparatus are mainly thermally expanded by heat from a light source, respectively. However, materials used in the light guide plate and the reflection sheet have different heat expansion rates from each other. As described above, in the configuration in which the reflection sheet is attached to the light guide plate, a shift is generated by differences of elongation amount in a plane direction, hence a part of the reflection sheet may be peeled off from the light guide plate. Specifically, the light guide plate uses a highly translucent resin such as methyl methacrylate (PMMA), MS, or the like, whereas the reflection sheet often uses a resin which is easy to frost such as polyethylene terephthalate (PET) or the like. A thermal expansion coefficient of PMMA is larger than the thermal expansion coefficient of PET, and for example, in a display apparatus having a size of 60 to 70 inches, a shift in the plane direction of about 2 mm in a longitudinal direction and 1 mm in a lateral direction may occur between the light guide plate and the reflection sheet.

PMMA has characteristics of expanding due to moisture absorption, and the shift may be enlarged by absorbing moisture in the air. When such a shift occurs, since the shift amount becomes larger toward a peripheral edge, the peripheral edge part of the reflection sheet is highly likely to be peeled off from the light guide plate. In the case where a part of the reflection sheet attached to the light guide plate is peeled off, a difference in distance between the light guide plate and the reflection sheet occur in the peeled off part and other parts, and brightness is changed between when seen the light guide plate from the front and when obliquely seen the same. Thereby, a problem such as an uneven brightness occurs in a display surface of the display apparatus.

Further, in the above-described configuration in which the reflection sheet is attached to the light guide plate by the scattering adhesive dot, in the case where the light guide plate and the reflection sheet are respectively thermally expanded and shifted in the plane direction by a difference in an elongated amount, the reflection sheet may be peeled off from the light guide plate together with the scattering adhesive dot. In this case, since light is not scattered at a region where the scattering adhesive dot is peeled off, uniformity of light from the light guide plate is lost, and thereby problems such as uneven brightness in the display surface, a decrease in brightness, or the like may occur in the display apparatus.

In the case where an intensity of attaching the reflection sheet to the light guide plate is high, the light guide plate may be warped to be raised on a side opposite to the reflection sheet due to a difference in the thermal expansion coefficient as described above. In particular, when using a large light guide plate, warping is highly likely to occur, but in the display apparatus using a large light guide plate, the light guide plate abuts another member of the liquid crystal panel side, such that problems may occur in a mechanism of the display apparatus.

The present invention has been made in view of the circumstances described above, and aims to provide a light source device which may disperse a shift in the plane direction by a reflection sheet caused by a difference in heat expansion rates so as to maintain good display quality, and a display apparatus using the light source device.

A light source device according to the present invention, including a transparent plate, a light source disposed to face a part of a peripheral surface of the transparent plate along the part, and a reflection sheet attached to one wide surface of the transparent plate, is characterized in that the reflection sheet includes a plurality of cut lines formed in a predetermined range including a center at a predetermined interval.

The light source device according to the present invention is characterized in that the plurality of cut lines are provided over an entire surface of the reflection sheet.

The light source device according to the present invention is characterized in that a part or all of the plurality of cut lines are provided in a direction intersecting a direction in which light from the light source is progressed.

The light source device according to the present invention is characterized in that the reflection sheet has a rectangular shape, and a part or all of the plurality of cut lines are provided in a direction intersecting a longitudinal direction and a lateral direction of the reflection sheet.

The light source device according to the present invention is characterized in that the plurality of cut lines are provided in a shape of straight lines having different directions from each other.

The light source device according to the present invention is characterized in that the plurality of cut lines are provided in a curved shape.

The light source device according to the present invention is characterized in that the plurality of cut lines are provided so as to make a polygon shape having sides formed by each side of the plurality of cut lines.

The light source device according to the present invention is characterized in that the plurality of cut lines are provided so as to be cut in a honeycomb shape.

The light source device according to the present invention is characterized in that the plurality of cut lines are provided so as to be cut in a mesh shape.

The light source device according to the present invention is characterized in that a plurality of scattering adhesive bodies including light scattering bodies and being attached to the one wide surface of the transparent plate, and the reflection sheet is attached to the transparent plate by the scattering adhesive bodies.

The light source device according to the present invention is characterized in that the reflection sheet is attached to the transparent plate by a scattering adhesive layer including light scattering bodies therein, and the scattering adhesive layer has cut lines at positions corresponding to the cut lines of the reflection sheet.

The light source device according to the present invention is characterized in that the cut lines of the scattering adhesive layer are provided from the reflection sheet side with a shallower depth than an entire thickness of the scattering adhesive layer.

The light source device according to the present invention is characterized in that the one wide surface of the transparent plate are provided with a reflection layer having a plurality of holes, and the reflection sheet is attached to the reflection layer by the scattering adhesive layer.

The light source device according to the present invention is characterized in that the reflection sheet is attached to the transparent plate by a scattering adhesive sheet which has, on both surfaces of a sheet body, a scattering adhesive layer including light scattering bodies, and an adhesive layer with no light scattering body added thereto, the reflection sheet has a plurality of cut lines over an entire surface, the scattering adhesive sheet has cut lines at positions corresponding to the cut lines of the reflection sheet, and the cut lines are provided with a depth so as to leave a part of the scattering adhesive layer away from the reflection sheet.

The light source device according to the present invention is characterized in that the one wide surface of the transparent plate is provided with a reflection layer having a plurality of holes, and the reflection sheet is attached to the reflection layer of the transparent plate by the scattering adhesive sheet.

A display apparatus according to the present invention, including a liquid crystal panel, a transparent plate disposed to face the liquid crystal panel, a light source disposed to face a part of a peripheral surface of the transparent plate along the part, and a reflection sheet attached to one wide surface on a side opposite to the liquid crystal panel of the transparent plate, is characterized in that the reflection sheet includes a plurality of cut lines formed in a predetermined range including a center at a predetermined interval.

In the present invention, the reflection sheet attached to one wide surface side of the transparent plate has a plurality of cut lines. The plurality of cut lines are formed in a prescribed range including a center thereof at a prescribed interval. Thereby, even when the transparent plate and the reflection sheet are thermally expanded in expansion coefficients different from each other, and a shift in the plane direction is generated between the transparent plate and the reflection sheet, differences in elongation amount between the transparent plate and the reflection sheet are absorbed by enlarging and opening the cut lines, such that the reflection sheet or the scattering adhesive dots may be prevented from being peeled off from the transparent plate.

In the present invention, the plurality of cut lines are dispersedly provided over an entire surface of the reflection sheet. Thereby, it is possible to absorb the shift over the entire surface of the reflection sheet.

In the present invention, a part or all of the plurality of cut lines are provided in a direction intersecting a direction in which light from the light source is progressed on the surface of the reflection sheet. Thereby, even if the cut lines are enlarged and opened, an effect to the display surface may be reduced.

In the present invention, when the reflection sheet is a rectangular shape, a part or all of the plurality of cut lines are provided in a direction intersecting the longitudinal direction and lateral direction of the reflection sheet. In this case, even if the cut lines are enlarged and opened, since the cut lines in the display surface are not laid along the longitudinal and lateral directions, an effect such as an occurrence of moiré in the display surface may be reduced.

In the present invention, the plurality of cut lines may be provided in a curved shape. In addition, in the present invention, the plurality of cut lines may be provided in a shape of straight lines having different directions from each other. Thereby, it is possible to cope with the shift in different directions on a surface between the transparent plate and the reflection sheet.

In the present invention, the plurality of cut lines are provided so as to make a polygon shape having sides formed by each side of the plurality of cut lines. Thereby, it is possible to cope with the shift in different directions on a surface between the transparent plate and the reflection sheet. In addition, by making the cut lines in a symmetrical and continuous shape, the cut lines may be easily formed. Further, the polygon may be a rectangle or a triangle. The cut lines formed in a polygon shape may be provided so as to cut the reflection sheet in a mesh shape, or cut the reflection sheet in a honeycomb shape.

In the present invention, the reflection sheet is attached to the transparent plate by a scattering adhesive layer obtained by adding light scattering bodies therein, and the scattering adhesive layer is also provided with the cut lines corresponding to the reflection sheet. Thereby, it is possible to prevent both of the scattering adhesive layer including the light scattering bodies and the reflection sheet from being peeled off from the transparent plate.

According to the present invention, in the configuration in which the reflection sheet is attached to the transparent plate by the scattering adhesive layer obtained by adding light scattering bodies therein, the cut lines provided in the scattering adhesive layer may be provided on the reflection sheet side with a depth so as to leave a part of the scattering adhesive layer away therefrom. Thereby, even when the reflection sheet has the cut lines dispersed over the entire surface thereof, the reflection sheet may maintain a shape of the sheet, such that the reflection sheet may be easily handled during assembling.

According to the present invention, since the reflection sheet or the scattering adhesive dots may be prevented from being peeled off from the light guide plate, an occurrence of problems such as luminance unevenness, a decrease in luminance, or the like in the display surface may be prevented.

BRIEF DESCRIPTION OF THE DRAWINGS

FIG. 7 is a schematic cross-sectional view of the light source device according to Embodiment 4.

DESCRIPTION OF THE EMBODIMENTS

Hereinafter, the present invention will be described in detail with reference to the accompanying drawings illustrating embodiments thereof. In addition, the embodiments illustrated below are an example, and the present invention is not limited to the configuration described below.

(Embodiment 1)

Figure 1:
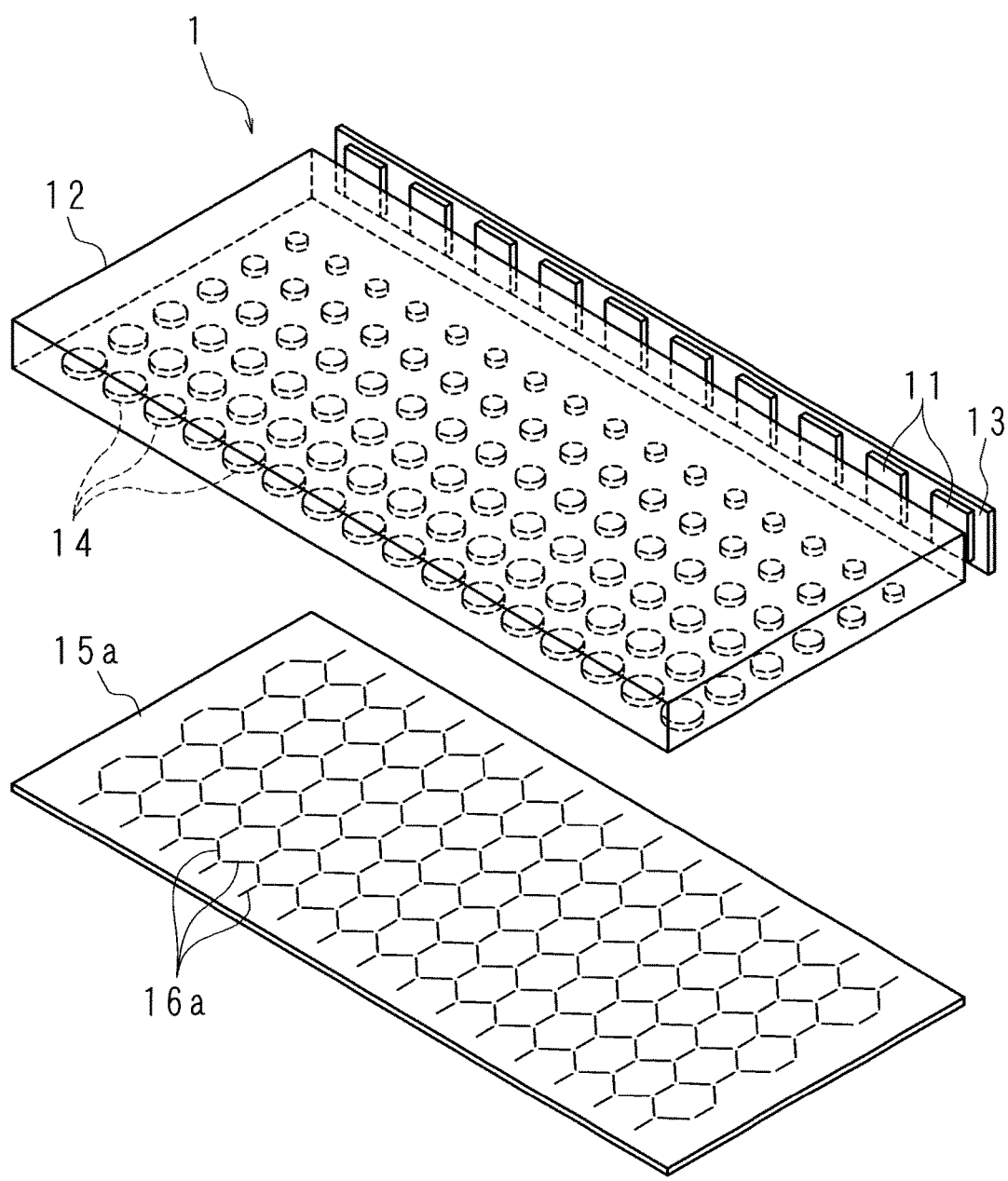
FIG. 1 is a schematic exploded perspective view of a light source device according to Embodiment 1.
Figure 2:
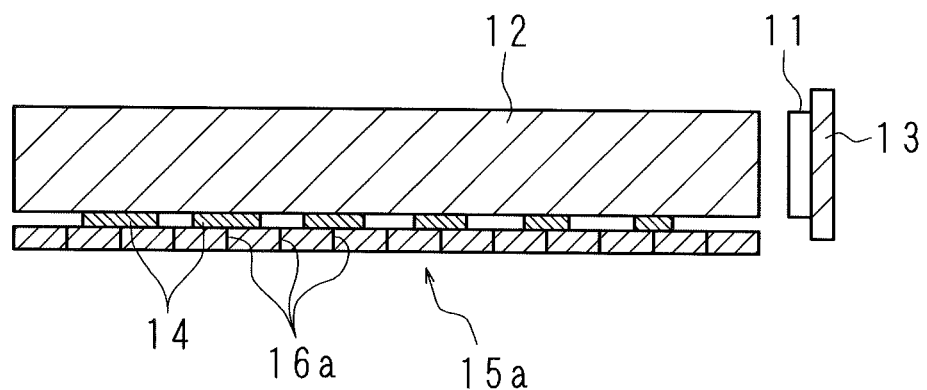
FIG. 2 is a schematic cross-sectional view of the light source device according to Embodiment 1.

FIG. 1 is a schematic exploded perspective view of a light source device 1 according to Embodiment 1, and FIG. 2 is a schematic cross-sectional view of the light source device 1 according to Embodiment 1.

The light source device 1 is an edge light type light source device using light emitting diodes 11. The light source device 1 has the light emitting diodes 11, a light guide plate 12, and a reflection sheet 15a.

The light emitting diode 11 is a light source which emits white light by providing a fluorescent body layer, in which a fluorescent body emitting yellow fluorescent light or fluorescent bodies respectively emitting blue, red and green fluorescent light are mixed, on a surface of a diode emitting a blue color or ultraviolet. A plurality of light emitting diodes 11 are disposed on an elongated substrate 13.

The light guide plate 12 is a rectangular flat plate made of a transparent resin material such as PMMA or the like. The light guide plate 12 is provided with a plurality of adhesive dots 14 on one wide surface thereof.

The adhesive dots 14 are formed on the one wide surface of the light guide plate 12 to be arranged in a plurality of rows in each of longitudinal and lateral directions using a material of an adhesive obtained by adding the light scattering bodies therein by printing such as inkjet printing, screen printing or the like. The plurality of adhesive dots 14 are formed in a substantially semicircular shape having a prescribed thickness, respectively. A diameter of the adhesive dot becomes larger with increasing distance away from an end face of one long side of the light guide plate 12.

The reflection sheet 15a is a sheet in which a metal film or the like as a reflection layer is laminated on a PET film as a base material, and totally reflects light incident on one surface. The reflection sheet 15a according to Embodiment 1 is provided with a plurality of cut lines 16a with a gap between each other over an entire surface except for a peripheral edge part thereof. The plurality of cut lines 16a are provided so as to cut the reflection sheet 15a in a honeycomb shape. Further, each cut line 16a is provided with a depth so as to reach a rear surface from one surface of the reflection sheet 15a.

The light source device 1 is configured in such a manner that the light emitting diodes 11 are disposed to face the end face of the one long side of the light guide plate 12, that is, the end face of the one long side in which the diameter of the adhesive dots 14 becomes smaller, and the light emitting diodes 11 are disposed on the substrate 13 so as to be laid along the end face, and further the reflection sheet 15a is attached to the light guide plate 12 by the adhesive dots 14. In this regard, an air layer as much as the thickness of the adhesive dots 14 is present in the gaps of the adhesive dots 14 between the light guide plate 12 and the reflection sheet 15a. Thereby, in the wide surface of the light guide plate 12, a region in which light from the light emitting diodes 11 is totally reflected and a region in which the light is scattered are provided. Further, the substrate 13 of the light emitting diodes 11 is positioned by being held by a holding member (not illustrated) together with the light guide plate 12.

In the light source device 1 configured as described above, the light emitted from the light emitting diodes 11 is entered into the light guide plate 12 from the end face (incident surface), repeatedly totally reflected on a boundary surface between the light guide plate 12 and the air layer, and progressed to a side opposite to the incident surface. The light reaching the boundary surface between the light guide plate 12 and the adhesive dots 14 among the light progressing in the light guide plate 12 is refracted and entered into the adhesive dots 14, and is then irregularly reflected by the light scattering bodies present in the adhesive dots 14. Then, a part thereof is again entered into the light guide plate 12, and the other part is made incident on the air layer between adhesive dots 14 or the reflection sheet 15a. Most of the light irregularly reflected in the adhesive dots 14 and again entered into the light guide plate 12 reaches a surface (emitting surface) of a side opposite to the reflection sheet 15a of the light guide plate 12 at a smaller angle than a critical angle, thereby being emitted to an outside from the emitting surface. The light irregularly reflected in the adhesive dots 14 and again entered into the air layer are progressed into the air layer, and then made incident on the other adhesive dots 14, the reflection sheet 15a or the light guide plate 12. The light incident on the other adhesive dots 14 is similarly irregularly reflected, and a part thereof is again entered into the light guide plate 12 and the other part is made incident on the air layer or the reflection sheet 15a. The light reaching the reflection sheet 15a is totally reflected toward the light guide plate 12 by the reflection layer of the reflection sheet 15a. The totally reflected light is again entered into the light guide plate 12, but most of it reaches the emitting surface at a smaller angle than the critical angle, thereby being emitted to the outside from the emitting surface. Thereby, the light is emitted from each region of the emitting surface of the light guide plate 12. In addition, since the diameter of the adhesive dots 14 of the light guide plate 12 becomes larger toward a side opposite to the incident surface of light from the light emitting diodes 11, the amount of light irregularly reflected to the light guide plate 12 becomes larger with increasing distance away from the incident surface. Thereby, the light from the emitting surface of the light guide plate 12 is equally distributed and entirely emitted. As described above, the light source device 1 functions as a surface light source to emit the light from the emitting surface with uniform illumination.

The light source device 1 is entirely heated by heat generated from the light emitting diodes 11 during operation, and the light guide plate 12 and the reflection sheet 15a are thermally expanded. In this case, the light guide plate 12 and the reflection sheet 15a are thermally expanded in relation to the different expansion coefficients of respective materials. Thus, a shift in a plane direction is generated between the light guide plate 12 and the reflection sheet 15a due to differences in elongation amount therebetween. However, since the reflection sheet 15*a* has the plurality of cut lines 16*a*, the differences in elongation amount are absorbed by enlarging and opening the cut lines 16*a*, and therefore the reflection sheet 15*a* is rarely peeled off from the light guide plate 12. Even if a part of the reflection sheet 15*a* is broken at the cut lines 16*a*, the fragmented reflection sheet 15*a* remains attached to the light guide plate 12. Therefore, light from the emitting surface of the light guide plate 12 may be uniformly emitted.

In the case where a display apparatus is configured by providing the light source device 1 illustrated in Embodiment 1 on the rear surface of the liquid crystal panel, even if the device itself is heated mainly by heat generated from the light emitting diodes 11 during operation, and the light guide plate 12 and the reflection sheet 15*a* are thermally expanded, the reflection sheet 15*a* is prevented from being peeled off, and uniformity of light from the light source device 1 is not deteriorated. Therefore, an occurrence of luminance unevenness in the display apparatus may be prevented. In addition, in the display apparatus using the light source device 1, most of the plurality of cut lines 16*a* of the reflection sheet 15*a* are in a direction intersecting the longitudinal and lateral directions of pixels in the display surface. Therefore, even if the cut lines 16*a* of the reflection sheet 15*a* are enlarged and opened, an occurrence of moiré in the display surface may be prevented.

In Embodiment 1, the cut lines 16*a* of the reflection sheet 15*a* are configured to be provided over the entire surface except for the peripheral edge part thereof. By leaving the peripheral edge part intact, a shape of sheet is maintained without fragmenting the reflection sheet 15*a*, such that the reflection sheet 15*a* may be easily handled during assembling. Further, in Embodiment 1, the depth of each cut line 16*a* is set with a depth so as to reach the rear surface from one surface of the reflection sheet 15*a*, but it is not limited thereto, and a part of the rear surface of a reflection surface may be allowed to remain.

(Embodiment 2)

Figure 3:
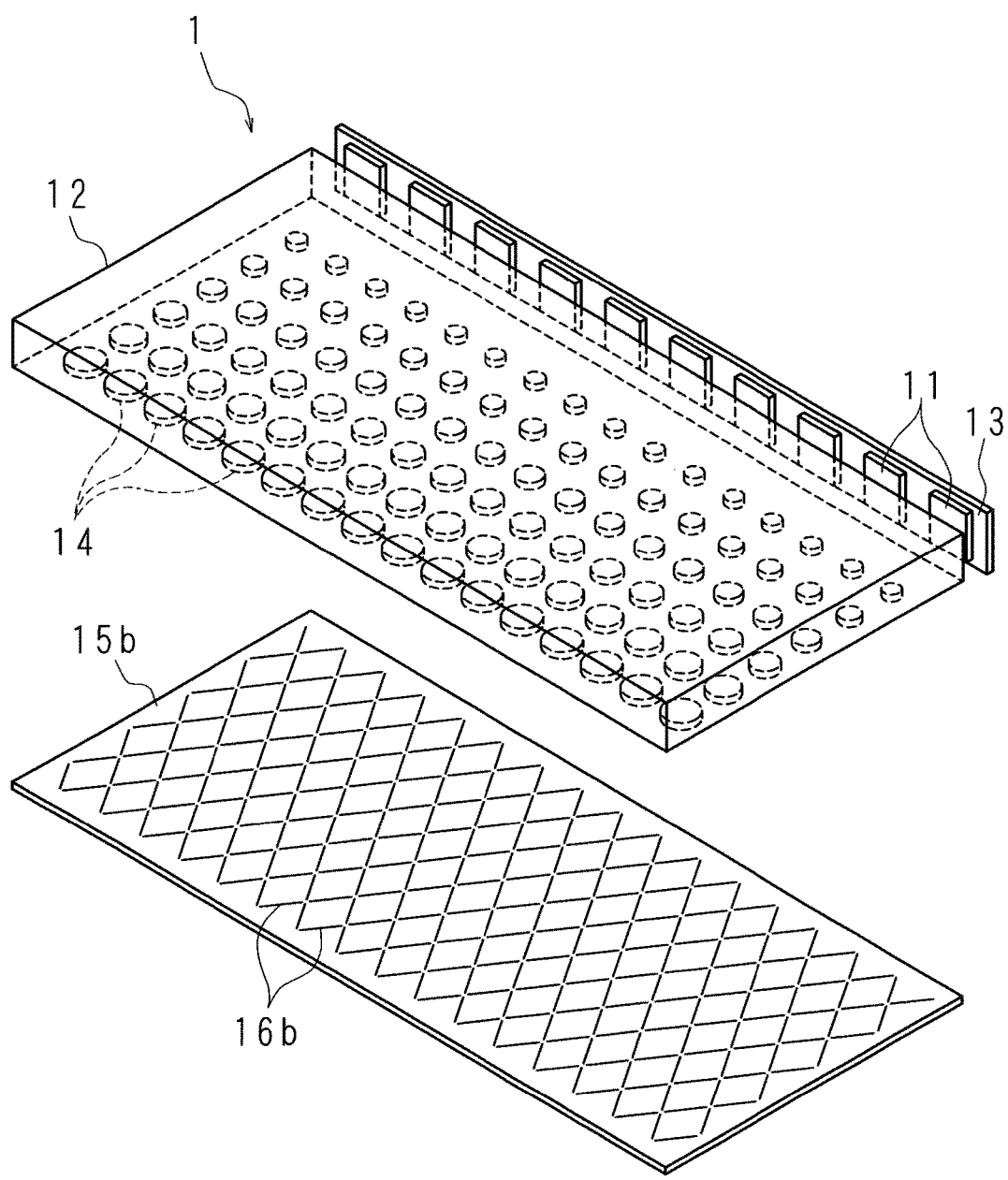
FIG. 3 is a schematic exploded perspective view of a light source device according to Embodiment 2.

FIG. 3 is a schematic exploded perspective view of a light source device 1 according to Embodiment 2. The light source device 1 according to Embodiment 2 has the same configuration as the light source device 1 according to Embodiment 1, except that the shape formed by the cut lines is different from the Embodiment 1, such that the components having configurations common to Embodiment 1 are denoted by the same reference numerals and will not be described in detail.

As illustrated in FIG. 3, a reflection sheet 15*b* of the light source device 1 according to Embodiment 2 has a plurality of cut lines 16*b* over the entire surface except for the peripheral edge part thereof. The plurality of cut lines 16*b* according to Embodiment 2 are provided each having a gap so as to cut the reflection sheet 15*b* in a mesh shape.

Also, in Embodiment 2, the light source device 1 is entirely heated by heat generated from the light emitting diodes 11 during operation, and the light guide plate 12 and the reflection sheet 15*b* are thermally expanded. In this case, the light guide plate 12 and the reflection sheet 15*b* are thermally expanded in relation to the different expansion coefficients of respective materials. Thus, a shift in the plane direction is generated between the light guide plate 12 and the reflection sheet 15*b* due to differences in elongation amount therebetween. However, since the reflection sheet 15*b* has the plurality of cut lines 16*b*, the differences in elongation amount are absorbed by enlarging and opening the cut lines 16*b*, and therefore the reflection sheet 15*b* is rarely peeled off from the light guide plate 12. Even if a part of the reflection sheet 15*b* is broken at the cut lines 16*b*, a part of the fragmented reflection sheet 15*b* remains attached to the light guide plate 12. Therefore, light from the emitting surface of the light guide plate 12 may be uniformly emitted.

When the display apparatus is configured by providing the light source device 1 illustrated in Embodiment 2 on the rear surface of the liquid crystal panel, even if the device itself is heated, and the light guide plate 12 and the reflection sheet 15*b* are thermally expanded, the reflection sheet 15*b* is prevented from being peeled off, and uniformity of light from the light source device 1 is not deteriorated. Therefore, an occurrence of luminance unevenness in the display apparatus using the light source device 1 may be prevented. In addition, in the display apparatus using the light source device 1, the plurality of cut lines 16*b* are in a direction intersecting the longitudinal and lateral directions of pixels in the display surface. Therefore, even if the reflection sheet 15*b* is configured to be provided with the cut lines 16*b*, an occurrence of moiré in the display surface may be prevented.

Also, in Embodiment 2, the cut lines 16*b* of the reflection sheet 15*b* are configured to be provided over the entire surface except for the peripheral edge part thereof. By leaving the peripheral edge part intact, a shape of sheet is maintained without fragmenting the reflection sheet 15*b*, such that the reflection sheet 15*b* may be easily handled during assembling. Further, the depth of each cut line 16*b* is set with a depth so as to reach the rear surface from one surface of the reflection sheet 15*b*, but it is not limited thereto, and a part of the rear surface of the reflection surface may be allowed to remain.

(Embodiment 3)

Figure 4:
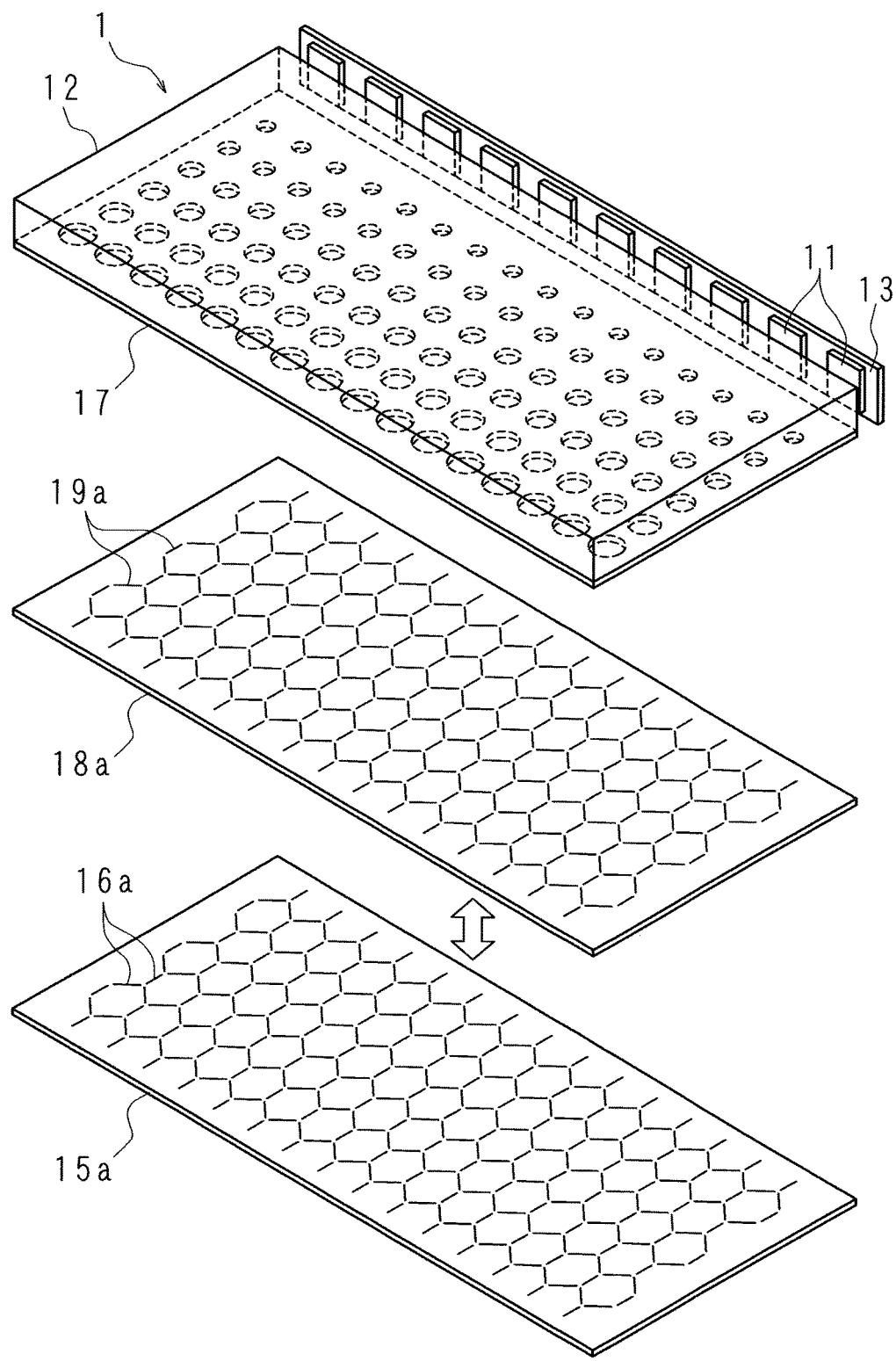
FIG. 4 is a schematic exploded perspective view of a light source device according to Embodiment 3.
Figure 5:
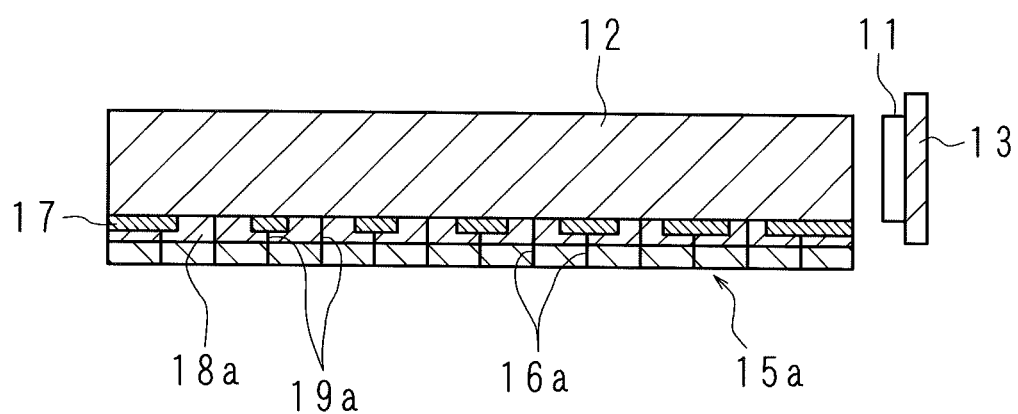
FIG. 5 is a schematic cross-sectional view of the light source device according to Embodiment 3.

FIG. 4 is a schematic exploded perspective view of a light source device 1 according to Embodiment 3, and FIG. 5 is a schematic cross-sectional view of the light source device 1 according to Embodiment 3. Further, the components having configurations common to the light source device 1 according to Embodiment 1 among the components of the light source device 1 according to Embodiment 3 are denoted by the same reference numerals and will not be described in detail.

The light guide plate 12 according to Embodiment 3 is provided with a reflection layer 17 on a surface opposite to the emitting surface thereof, instead of the adhesive dots 14. The reflection layer 17 is a metal film or a white resin. The reflection layer 17 is formed to have a prescribed depth by printing on the light guide plate 12. In addition, the reflection layer 17 has a plurality of substantially circular holes provided so as to be cut out of the reflection layer 17 in a thickness direction thereof. Each hole is formed so as to be arranged in a plurality of rows in each of longitudinal and lateral directions of the reflection layer 17 surface. Further, the diameter of the plurality of holes becomes larger with increasing distance away from the end face of the one long side of the light guide plate 12, that is, an end face side in which the light emitting diodes 11 are disposed.

The reflection sheet 15*a* according to Embodiment 3 is attached to the reflection layer 17 of the light guide plate 12 by the scattering adhesive layer 18*a*, instead of the adhesive dots 14. The scattering adhesive layer 18*a* is a layer formed of an adhesive having low viscoelasticity using an acrylic resin-based material obtained by adding the light scattering bodies therein. The scattering adhesive layer 18*a* has a plurality of cut lines 19*a* corresponding to the same position as the cut lines 16*a*. That is, the plurality of cut lines 19*a* are provided so as to cut the scattering adhesive layer 18*a* in a honeycomb shape. Further, each cut line 19*a* is provided with a depth so as to reach the rear surface from one surface of the scattering adhesive layer 18a.

The light source device 1 according to Embodiment 3 is configured in such a manner that the light emitting diodes 11 are disposed to face the end face of one long side of the light guide plate 12, that is, the end face of a side in which the diameter of the holes of the reflection layer 17 becomes smaller, and the light emitting diodes 11 are disposed on the substrate 13 so as to be laid along the end face, and further the reflection sheet 15a is attached on the reflection layer 17 together with the scattering adhesive layer 18a. In this regard, the scattering adhesive layer 18a comes into close contact with the reflection layer 17 so as to be filled into the holes thereof defined by the light guide plate 12, and as illustrated in FIG. 5, the light guide plate 12 and the scattering adhesive layer 18a come into close contact with each other in the holes of the reflection layer 17. Thereby, in the surface opposite to the emitting surface of the light guide plate 12, a region in which light from the light emitting diodes 11 is totally reflected and a region in which the light is scattered are provided.

In the light source device 1 according to Embodiment 3 configured as described above, the light emitted from the light emitting diodes 11 is entered into the light guide plate 12 from the incident surface thereof, repeatedly totally reflected on the boundary surface between the light guide plate 12 and the reflection layer 17, and progressed to a side opposite to the incident surface. The light reaching the boundary surface with the scattering adhesive layer 18a coming into close contact with the light guide plate 12 in the holes of the reflection layer 17 among the light progressing in the light guide plate 12 is refracted and entered into the scattering adhesive layer 18a. The light entered into the scattering adhesive layer 18a is irregularly reflected by the light scattering bodies present therein, then a part thereof is again entered into the light guide plate 12, and the other part reaches the reflection sheet 15a. Most of the light entered again into the light guide plate 12 reaches the emitting surface of the light guide plate 12 at a smaller angle than the critical angle, thereby being emitted to the outside from the emitting surface. The light reaching the reflection sheet 15a is totally reflected toward the light guide plate 12 by the reflection layer of the reflection sheet 15a. The totally reflected light is entered into the scattering adhesive layer 18a, then a part thereof is irregularly reflected by the light scattering bodies present therein, and the other part is again entered into the light guide plate 12. Most of the light entered again into the light guide plate 12 reaches the emitting surface thereof at a smaller angle than the critical angle, thereby being emitted to the outside from the emitting surface. Therefore, the light is emitted from each region of the emitting surface of the light guide plate 12. The diameter of the plurality of holes included in the reflection layer 17 becomes larger with increasing distance away from the incident surface of the light from the light emitting diodes 11, thereby a boundary area with the scattering adhesive layer 18a becomes larger with increasing distance away from the incident surface. Therefore, the amount of light irregularly reflected to the emitting surface of the reflection sheet 15a becomes larger with increasing distance away from the incident surface. Thereby, the light from the emitting surface of the light guide plate 12 is equally distributed and entirely emitted. As described above, the light source device 1 functions as a surface light source to emit the light from the emitting surface with uniform illumination.

Also, in Embodiment 3, the light source device 1 is entirely heated by heat generated from the light emitting diodes 11 during operation, and the light guide plate 12 and the reflection sheet 15a are thermally expanded. In this case, a shift in the plane direction is generated between the light guide plate 12 and the reflection sheet 15a due to differences in elongation amount therebetween. However, since the reflection sheet 15a has the plurality of cut lines 16a, the differences in elongation amount are absorbed by enlarging and opening the cut lines 16a, and therefore the reflection sheet 15a is rarely peeled off from the light guide plate 12. In addition, since the scattering adhesive layer 18a also has the cut lines 19a at positions corresponding to the cut lines 16a of the reflection sheet 15a, the shift thereof with the light guide plate 12 is absorbed by enlarging and opening the plurality of cut lines 19a, and therefore the scattering adhesive layer 18a is rarely peeled off from the light guide plate 12. Even if a part of the reflection sheet 15a is broken at the cut lines 16a and a part of the scattering adhesive layer 18a is broken at the cut lines 19a, the fragmented reflection sheet 15a and scattering adhesive layer 18a remain attached to the light guide plate 12. Therefore, the reflection sheet 15a and the scattering adhesive layer 18a are rarely peeled off from the light guide plate 12, and light from the emitting surface of the light source device 1 may be uniformly emitted.

When the display apparatus is configured by providing the light source device 1 illustrated in Embodiment 3 on the rear surface of the liquid crystal panel, even if the device itself is mainly heated by heat generated from the light emitting diodes 11 during operation, and the light guide plate 12 and the reflection sheet 15a are thermally expanded, the reflection sheet 15a and the scattering adhesive layer 18a are prevented from being peeled off from the light guide plate, and uniformity of light from the light source device 1 is not deteriorated. Therefore, an occurrence of problems such as luminance unevenness, a decrease in luminance, or the like in the display apparatus using the light source device 1 may be prevented.

Further, the depth of the cut lines 19a of the scattering adhesive layer 18a according to Embodiment 3 is set with a depth so as to reach the rear surface from one surface thereof, but it is not limited thereto, and the cut lines may be shallowly provided so as to leave a part of the reflection layer 17 side. In addition, the scattering adhesive layer 18a may previously formed on the reflection surface of the reflection sheet 15a, and the cut lines 19a may be formed together with the reflection sheet 15a.

(Embodiment 4)

Figure 6:
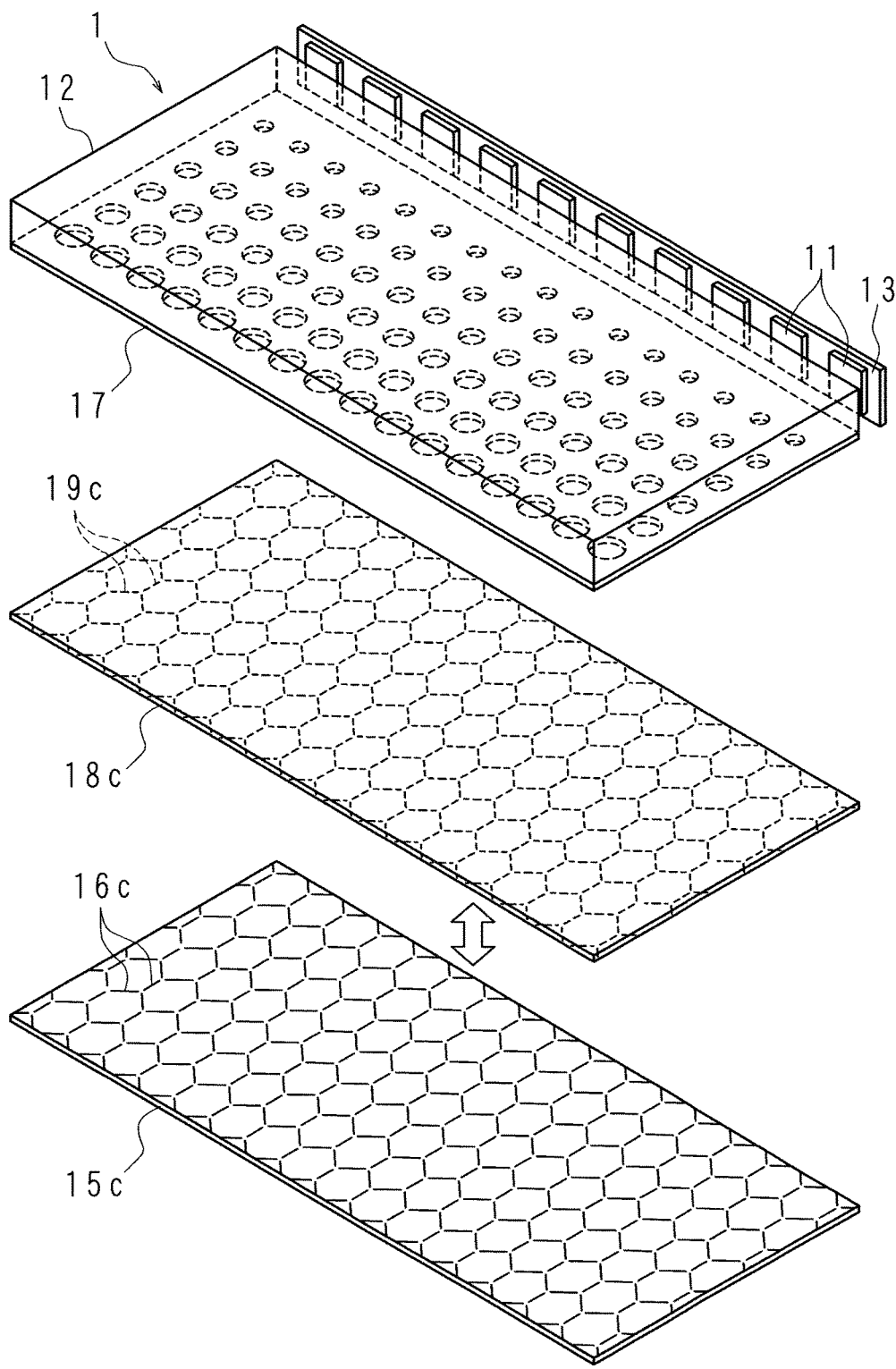
FIG. 6 is a schematic exploded perspective view of a light source device according to Embodiment 4.

FIG. 6 is a schematic exploded perspective view of a light source device 1 according to Embodiment 4, and FIG. 7 is a schematic cross-sectional view of the light source device 1 according to Embodiment 4. Further, the components having configurations common to the light source device 1 according to Embodiments 1 to 3 among the components of the light source device 1 according to Embodiment 4 are denoted by the same reference numerals and will not be described in detail.

The light source device 1 according to Embodiment 4 is configured in such a manner that a reflection sheet 15c is attached on the reflection layer 17 of one rectangular wide surface of the light guide plate 12 by a scattering adhesive layer 18c.

The reflection sheet 15c according to Embodiment 4 has a plurality of cut lines 16c. The plurality of cut lines 16c of the reflection sheet 15c according to Embodiment 4 are provided so as to cut the reflection sheet 15c in a honeycomb shape over the entire surface without remaining the peripheral edge part thereof. In addition, each cut line 16c is provided with a depth so as to reach the rear surface from one surface of the reflection sheet 15c.

The scattering adhesive layer 18c according to Embodiment 4 has a plurality of cut lines 19c. The plurality of cut lines 19c in the scattering adhesive layer 18c according to Embodiment 4 are provided over the entire surface including the peripheral edge part thereof at the same position as the cut lines 16c of the reflection sheet 15c. However, the plurality of cut lines 19c are shallowly formed with a depth so as not to reach the rear surface from one surface of the scattering adhesive layer 18c, such that the cut lines 19c cannot be seen from the rear surface.

In the light source device 1 according to Embodiment 4, the reflection sheet 15c is attached on the reflection layer 17 together with the scattering adhesive layer 18c. In this regard, the rear surface of the scattering adhesive layer 18c becomes the reflection layer 17 side, and the above-described one surface becomes the reflection surface side of the reflection sheet 15c. Also, in Embodiment 4, the scattering adhesive layer 18c comes into close contact with the reflection layer 17 so as to be filled into the holes thereof defined by the light guide plate 12, and as illustrated in FIG. 7, the light guide plate 12 and the scattering adhesive layer 18c come into close contact with each other in the holes of the reflection layer 17. Thereby, in the surface opposite to the emitting surface of the light guide plate 12, a region in which light from the light emitting diodes 11 is totally reflected and a region in which the light is scattered are provided.

Also, in Embodiment 4, the light source device 1 is entirely heated by heat generated from the light emitting diodes 11 during operation, and the light guide plate 12 and the reflection sheet 15c are thermally expanded. In this case, a shift in the plane direction is generated between the light guide plate 12 and the reflection sheet 15c due to differences in elongation amount therebetween. However, the differences in elongation amount are absorbed by enlarging and opening the cut lines 16c of the reflection sheet 15c, and therefore the reflection sheet 15c is rarely peeled off from the light guide plate 12. Similarly, the shift of the scattering adhesive layer 18c with the light guide plate 12 is also absorbed by enlarging and opening the cut lines 19c, and therefore the scattering adhesive layer 18c is rarely peeled off from the light guide plate 12. Even if a part of the reflection sheet 15c is broken at the cut lines 16c and a part of the scattering adhesive layer 18c is broken at the cut lines 19c, the fragmented reflection sheet 15c and the scattering adhesive layer 18c remain attached to the light guide plate 12, such that the reflection sheet 15c and the scattering adhesive layer 18c may be prevented from being peeled off from the light guide plate 12. In particular, in Embodiment 4, since the cut lines 16c are provided over the entire surface of the reflection sheet 15c, it is possible to absorb differences in elongation amount at the peripheral edge part in which a shift thereof with the light guide plate 12 becomes larger. Therefore, the reflection sheet 15c and the scattering adhesive layer 18c are rarely peeled off from the light guide plate 12, and thereby, light from light source device 1 may be uniformly emitted.

In the case where the display apparatus is configured by providing the light source device 1 illustrated in Embodiment 4 on the rear surface of the liquid crystal panel, even if the device itself is mainly heated by heat generated from the light emitting diodes 11 during operation, and the light guide plate 12 and the reflection sheet 15c are thermally expanded, the reflection sheet 15c and the scattering adhesive layer 18c are prevented from being peeled off from the light guide plate, and uniformity of light from the light source device 1 is not deteriorated. Therefore, an occurrence of problems such as luminance unevenness, a decrease in luminance, or the like in the display apparatus using the light source device 1 may be prevented.

Further, in Embodiment 4, since the cut lines 19c of the scattering adhesive layer 18c are provided so as to leave the rear surface side, even when the cut lines 19c are provided over the entire surface, the shape of the scattering adhesive layer may be maintained. In addition, the scattering adhesive layer 18c is previously formed on the reflection sheet 15c, and the cut lines 19c are formed together with the reflection sheet 15c, such that the shape of sheet in the reflection sheet 15c is maintained, and thereby, when the reflection sheet is attached to the light guide plate 12 by the scattering adhesive layer 18c, it is possible to easily handle the reflection sheet without fragmenting the reflection sheet 15c.

(Embodiment 5)

Figure 8:
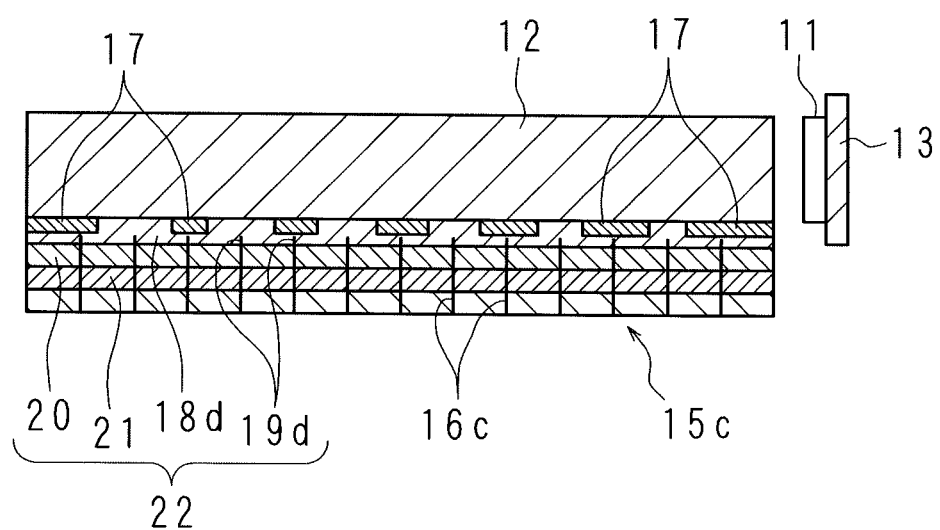
FIG. 8 is a schematic cross-sectional view of a light source device according to Embodiment 5.

FIG. 8 is a schematic cross-sectional view of a light source device 1 according to Embodiment 5. The components having configurations common to the light source device 1 according to Embodiments 1, 3 and 4 among the components of the light source device 1 according to Embodiment 5 are denoted by the same reference numerals and will not be described in detail.

The light source device 1 according to Embodiment 5 is configured in such a manner that a reflection sheet 15c is attached to the reflection layer 17 of one rectangular wide surface of the light guide plate 12 by a scattering adhesive sheet 22.

The scattering adhesive sheet 22 is a double-sided adhesive sheet which has, on both sides of a sheet body 20 formed of a transparent material, a scattering adhesive layer 18d formed of an adhesive having low viscoelasticity using an acrylic resin-based material obtained by adding the light scattering bodies therein; and an adhesive layer 21 formed of an adhesive using a transparent material with no light scattering body added thereto. The scattering adhesive sheet 22 has a plurality of cut lines 19d provided over the entire surface including the peripheral edge part at the same position as the cut lines 16c of the reflection sheet 15c. The plurality of cut lines 19d are shallowly formed with a depth so as not to reach the rear surface of the scattering adhesive layer 18d side from one surface of the adhesive layer 21 side, such that the cut lines 19d cannot be seen from the surface of the scattering adhesive layer 18d side.

In the light source device 1 according to Embodiment 5, the reflection sheet 15c is attached on the reflection layer 17 together with the scattering adhesive sheet 22. In this regard, the surface of the scattering adhesive layer 18d side of the scattering adhesive sheet 22 becomes the reflection layer 17 side, and the surface of the adhesive layer 21 side becomes the reflection sheet 15c side. Also, in Embodiment 5, the scattering adhesive layer 18d comes into close contact with the reflection layer 17 so as to be filled into the holes thereof defined by the light guide plate 12, and as illustrated in FIG. 8, the light guide plate 12 and the scattering adhesive layer 18d come into close contact with each other in the holes of the reflection layer 17. Thereby, in the surface opposite to the emitting surface of the light guide plate 12, a region in which light from the light emitting diodes 11 is totally reflected and a region in which the light is scattered are provided.

In the light source device 1 according to Embodiment 5 configured as described above, the sheet body 20 and the adhesive layer 21 are present between the scattering adhesive layer 18d and the reflection sheet 15c. The sheet body 20 and the adhesive layer 21 are translucent, and light emitted from the light emitting diodes 11 is equally distributed and entirely emitted from the emitting surface of the light guide plate 12 by the same principle as the Embodiment 3. Thereby, the light source device 1 functions as a surface light source to emit planar light with uniform illumination.

Also, in Embodiment 5, the light source device 1 is entirely heated by heat generated from the light emitting diodes 11 during operation, and the light guide plate 12 and the reflection sheet 15c are thermally expanded. Even when a shift in the plane direction is generated between the light guide plate 12 and the reflection sheet 15c due to differences in elongation amount therebetween, the shift due to differences in elongation amount is absorbed by enlarging and opening the cut lines 16c. Since the scattering adhesive sheet 22 also has the cut lines 19d at positions corresponding to the cut lines 16c of the reflection sheet 15c, the shift due to differences in elongation amount between the light guide plate 12 and the reflection sheet 15c is absorbed by enlarging and opening the cut lines 19d. Therefore, the scattering adhesive layer 18d is rarely peeled off from the light guide plate 12 together with the reflection sheet 15c. Even if a part of the reflection sheet 15c is broken at the cut lines 16c and a part of the scattering adhesive sheet 22 is broken at the cut lines 19d, the fragmented reflection sheet 15c and the scattering adhesive sheet 22 remain attached to the light guide plate 12. Therefore, the reflection sheet 15c and the scattering adhesive layer 18d are rarely peeled off from the light guide plate 12. In Embodiment 5, since the reflection sheet 15c and the scattering adhesive sheet 22 are respectively have the cut lines 16c and the cut lines 19d across the entire surface including the peripheral edge part thereof, the shift due to differences in elongation amount may be absorbed by these cut lines, and the reflection sheet 15c and the scattering adhesive layer 18d are rarely peeled off from the light guide plate 12. Thereby, light from the light source device 1 may be uniformly emitted.

Therefore, when the display apparatus is configured by providing the light source device 1 illustrated in Embodiment 5 on the rear surface of the liquid crystal panel, an occurrence of problems such as luminance unevenness, a decrease in luminance, or the like in the display surface may be prevented.

Further, in Embodiment 5, since the scattering adhesive sheet 22 having the scattering adhesive layer 18d formed on the sheet body 20 is used, the reflection sheet 15c may be easily handled during attaching it to the light guide plate 12 without fragmenting the reflection sheet 15c. In addition, since the scattering adhesive layer 18d is formed in the double-sided adhesive sheet shape, it is possible to handle this layer separately from the reflection sheet 15c during assembling.

In above-described Embodiments 1, 3 to 5, the plurality of cut lines 16a and 16c included in the reflection sheets 15a and 15c, or the plurality of cut lines 19a and 19c included in the scattering adhesive layers 18a and 18c are a shape of straight lines, respectively, and each cut line 16a, 16c, 19a, or 19c is provided so as to cut the reflection sheets or the adhesive layers in a honeycomb shape (continuing hexagon). In Embodiment 2, the plurality of cut lines 16b included in the reflection sheet 15b are a shape of straight lines, respectively, and the each cut line 16b is provided so as to cut the reflection sheet 15b in a mesh shape (continuing rectangle). However, the shape of each cut line and the shape formed by the plurality of cut lines are not limited to the configuration illustrated in Embodiments 1 to 5. For example, the cut lines may be formed so as to make a triangle shape having sides obtained by continuing each side thereof, a pentagonal shape, or other polygons. By the configuration formed so as to make a symmetrical and continuous shape, the cut lines may be easily processed. Further, each cut line may be a shape in which a plurality of straight lines are formed so as to be directed in random directions. Furthermore, each cut line may have a curved shape.

The present embodiment disclosed in the above is illustrated in all aspects and are regarded as not being limitative. The scope of the present invention is defined not by the above descriptions of the embodiment but by the claims, which intend to include all the meanings equivalent to the claims and all the modifications within the scope.

The invention claimed is:

1. A light source device comprising:
   a transparent plate;
   a light source disposed to face a part of a peripheral surface of the transparent plate along the part; and
   a reflection sheet attached to one wide surface of the transparent plate;
   wherein
   the reflection sheet includes a plurality of cut lines formed in a predetermined area including a center at a predetermined interval,
   the plurality of cut lines are provided so as to make a polygon shape having sides formed by the plurality of cut lines, and
   a plurality of polygon shaped parts partitioned by some of the plurality of cut lines in the reflection sheet are provided in a continuous state.

2. The light source device according to claim 1, wherein the plurality of cut lines are provided so as to be cut in a honeycomb shape.

3. The light source device according to claim 1, wherein the plurality of cut lines are provided so as to be cut in a mesh shape.

4. The light source device according to claim 1, further comprising a plurality of scattering adhesive bodies including light scattering bodies and being attached to the one wide surface of the transparent plate, wherein
   the reflection sheet is attached to the transparent plate by the scattering adhesive bodies.

5. The light source device according to claim 1, further comprising a scattering adhesive layer including light scattering bodies, attaching the reflection sheet to the transparent plate, and having cut lines at positions corresponding to the cut lines of the reflection sheet.

6. The light source device according to claim 1, further comprising a scattering adhesive sheet attaching the reflection sheet to the transparent plate, wherein
   the scattering adhesive sheet comprises:
     a sheet body;
     a scattering adhesive layer including light scattering bodies provided on one surface of the sheet body; and
     an adhesive layer with no light scattering body provided on the other surface of the sheet body, wherein
   the reflection sheet has a plurality of cut lines over an entire surface,
   the scattering adhesive sheet has cut lines at positions corresponding to the cut lines of the reflection sheet; and the cut lines of the scattering adhesive sheet are formed with a depth so as not to reach one surface of the scattering adhesive sheet which is a surface of the scattering adhesive layer side from the other surface of the scattering adhesive sheet which is a surface of the adhesive layer side.

7. The light source device according to claim 5, wherein the cut lines of the scattering adhesive layer are provided from the reflection sheet side with a shallower depth than an entire thickness of the scattering adhesive layer.

8. The light source device according to claim 5, further comprising a reflection layer provided on the one wide surface of the transparent plate, having a plurality of holes, wherein
the reflection sheet is attached to the transparent plate with the reflection layer by the scattering adhesive layer.

9. The light source device according to claim 6, further comprising a reflection layer provided on the one wide surface of the transparent plate, having a plurality of holes, and
the reflection sheet is attached to the transparent plate with the reflection layer of the transparent plate by the scattering adhesive sheet.

10. A display apparatus comprising:
a liquid crystal panel;
a transparent plate disposed to face the liquid crystal panel;
a light source disposed to face a part of a peripheral surface of the transparent plate along the part; and
a reflection sheet attached to one wide surface on a side opposite to the liquid crystal panel of the transparent plate;
wherein
the reflection sheet includes a plurality of cut lines formed in a predetermined area including a center at a predetermined interval,
the plurality of cut lines are provided so as to make a polygon shape having sides formed by the plurality of cut lines, and
a plurality of polygon shaped parts partitioned by some of the plurality of cut lines in the reflection sheet are provided in a continuous state.

11. The light source device according to claim 8, wherein the plurality of holes of the reflection layer are circular holes.

12. The light source device according to claim 11, wherein the holes have a diameter that is larger with increasing distance away from the part of the peripheral surface of the transparent plate along which the light source is disposed.

13. The light source device according to claim 1, wherein adjacent polygon shaped parts of the plurality of polygon shaped parts are continued via a corner point thereof.

14. The light source device according to claim 10, wherein adjacent polygon shaped parts of the plurality of polygon shaped parts are continued via a corner point thereof.

* * * * *